US009562984B2

(12) United States Patent
Ray et al.

(10) Patent No.: US 9,562,984 B2
(45) Date of Patent: Feb. 7, 2017

(54) LAND BASED SEISMIC DATA ACQUISITION UNIT

(71) Applicant: Fairfield Industries Incorporated, Sugar Land, TX (US)

(72) Inventors: Clifford H. Ray, Fulshear, TX (US); Glenn D. Fisseler, Houston, TX (US); William Guyton, Sugar Land, TX (US)

(73) Assignee: FAIRFIELD INDUSTRIES INCORPORATED, Sugar Land, TX (US)

( * ) Notice: Subject to any disclaimer, the term of this patent is extended or adjusted under 35 U.S.C. 154(b) by 686 days.

(21) Appl. No.: 14/089,161

(22) Filed: Nov. 25, 2013

(65) Prior Publication Data

US 2014/0086010 A1 Mar. 27, 2014

Related U.S. Application Data

(63) Continuation of application No. 11/977,580, filed on Oct. 25, 2007, now Pat. No. 8,605,543.
(Continued)

(51) Int. Cl.
*G01V 1/00* (2006.01)
*G01V 1/36* (2006.01)
*G01V 1/24* (2006.01)

(52) U.S. Cl.
CPC . *G01V 1/36* (2013.01); *G01V 1/00* (2013.01); *G01V 1/24* (2013.01); *G01V 2200/12* (2013.01)

(58) Field of Classification Search
CPC ............................... G01V 1/24; G01V 2200/12
See application file for complete search history.

(56) References Cited

U.S. PATENT DOCUMENTS 4,028,659 A 6/1977 Rihn
4,117,448 A 9/1978 Siems
(Continued)

FOREIGN PATENT DOCUMENTS

WO WO-03/102531 A2 12/2003
WO WO-2008/048624 A2 4/2008
WO WO-2009/066144 5/2009

OTHER PUBLICATIONS

Office Action for CA 2700280 issued Mar. 17, 2016.
(Continued)

*Primary Examiner* — Krystine Breier
(74) *Attorney, Agent, or Firm* — Foley & Lardner LLP; James De Vellis

(57) ABSTRACT

A wireless seismic data acquisition unit with a wireless receiver providing access to a common remote time reference shared by a plurality of wireless seismic data acquisition units in a seismic system. The receiver is capable of replicating local version of remote time epoch to which a seismic sensor analog-to-digital converter is synchronized. The receiver is capable of replicating local version of remote common time reference for the purpose of time stamping local node events. The receiver is capable of being placed in a low power, non-operational state over periods of time during which the seismic data acquisition unit continues to record seismic data, thus conserving unit battery power. The system implements a method to correct the local time clock based on intermittent access to the common remote time reference. The method corrects the local time clock via a voltage controlled oscillator to account for environmentally induced timing errors. The invention further provides for a more stable method of correcting drift in the local time clock.

20 Claims, 7 Drawing Sheets

Related U.S. Application Data

(60) Provisional application No. 60/994,711, filed on Sep. 21, 2007.

(56) References Cited

U.S. PATENT DOCUMENTS

| | | | |
|---|---|---|---|
| 4,449,248 | A | 5/1984 | Leslie et al. |
| 4,475,134 | A | 10/1984 | Bowden et al. |
| 4,519,011 | A | 5/1985 | Bowden |
| 4,604,699 | A | 8/1986 | Borcherdt et al. |
| 4,663,744 | A | 5/1987 | Russell et al. |
| 4,811,308 | A | 3/1989 | Michel |
| 5,654,718 | A | 8/1997 | Beason et al. |
| 5,724,241 | A | 3/1998 | Wood et al. |
| 5,854,605 | A | 12/1998 | Gildea |
| 5,864,315 | A * | 1/1999 | Welles, II ............ G01S 19/34 331/66 |
| 6,253,156 | B1 | 6/2001 | Bui-Tran et al. |
| 6,883,638 | B1 | 4/2005 | Maxwell et al. |
| 7,148,844 | B2 | 12/2006 | Salkhi |
| 7,253,671 | B2 | 8/2007 | Hall et al. |
| 7,310,287 | B2 | 12/2007 | Ray et al. |
| 7,395,175 | B2 | 7/2008 | Yamauchi et al. |
| 7,548,600 | B2 | 6/2009 | Laine et al. |
| 7,551,911 | B2 | 6/2009 | Shohara et al. |
| 7,660,201 | B2 | 2/2010 | Fleure et al. |
| 8,605,543 | B2 | 12/2013 | Ray et al. |
| 8,898,019 | B2 | 11/2014 | Adams et al. |
| 2004/0257913 | A1 | 12/2004 | Ray et al. |
| 2005/0052951 | A1 | 3/2005 | Ray et al. |
| 2006/0265176 | A1 | 11/2006 | Yamauchi et al. |
| 2007/0002987 | A1 | 1/2007 | Sinha et al. |
| 2007/0177459 | A1 | 8/2007 | Behn et al. |
| 2007/0188254 | A1 | 8/2007 | Sutardja |
| 2007/0189118 | A1 | 8/2007 | Chamberlain |
| 2008/0189044 | A1 | 8/2008 | Chamberlain et al. |
| 2008/0217057 | A1 | 9/2008 | Hall et al. |
| 2009/0080290 | A1 | 3/2009 | Ray et al. |
| 2010/0017139 | A1 | 1/2010 | Adams et al. |
| 2011/0299421 | A1 | 12/2011 | Werb et al. |
| 2014/0142858 | A1 | 5/2014 | Adams et al. |

OTHER PUBLICATIONS

Office Action for CN 201210289548.3 dated Oct. 19, 2015.
US Office Action on U.S. Appl. No. 12/907,713 dated Apr. 6, 2016.
Third Office Action for CN201210289548.3 issued May 5, 2016 (with English Translation).
U.S. Notice of Allowance dated Jul. 31, 2015 in related U.S. Appl. No. 12/907,713.
U.S. Appl. No. 60/974226, filed Sep. 21, 2007, Adams et al.
Final Office Action in U.S. Appl. 12/907,713 dated May 29, 2015 (8 pages).
Extended European Search Report in EP Application No. 08852981.3 dated Mar. 9, 2015 (7 pages).
First Office Action in Chines Application No. 201210289548.3 dated Feb. 3, 2015 (17 pages).
Office Action in Canadian Application No. 2,700,280 dated Mar. 17, 2015 (3 pages).
Great Soviet Encyclopedia, Head Editor—A.M. Prokhorov, 3rd edition, Moscow: Sovetskaia Entsiklopediia; 1971, p. 177.
Lee W. Young, International Search Report dated Feb. 5, 2010 for PCT Application No. PCT/IB2008/02958 filed Nov. 4, 2008, 2 pages.
Lee W. Young, Written Opinion of the International Searching Authority dated Feb. 5, 2010 for PCT Application No. PCT/IB2008/02958 filed Nov. 4, 2008, 10 pages.
Russian Office Action dated Oct. 29, 2012 issued in Russian Application No. 2010115753/28(022326), along with an English translation, 23 pages.
U.S. Final Office Action dated Mar. 18, 2013 in related U.S. Appl. No. 12/907,713, filed Oct. 19, 2010, 16 pages.
U.S. Non-Final Office Action dated Jul. 10, 2012 in related U.S. Appl. No. 12/907,713, dated Jul. 10, 2012, 12 pages.
U.S. Non-Final Office Action dated Mar. 13, 2013 in related U.S. Appl. No. 11/977,580, filed Oct. 25, 2007, 17 pages.
U.S. Notice of Allowance dated Sep. 18, 2013 in related U.S. Appl. No. 11/977,580, filed Oct. 25, 2007, 15 pages.

* cited by examiner

LAND BASED SEISMIC DATA ACQUISITION UNIT

CROSS-REFERENCE TO RELATED APPLICATIONS

This application claims the benefit of priority under 35 U.S.C. §120 as a continuation of U.S. patent application Ser. No. 11/977,580, filed Oct. 25, 2007, which claims the benefit of priority under 35 U.S.C. §119 of U.S. Provisional Patent Application No. 60/994,711 filed Sep. 21, 2007, each of which are incorporated by reference herein in their entirety.

BACKGROUND OF THE INVENTION

The present invention relates to the field of seismic exploration. More particularly, the invention relates to a method and apparatus for the control and correction of the time base used in a distributed nodal seismic acquisition system.

Seismic exploration generally utilizes a seismic energy source to generate an acoustic signal that propagates into the earth and is partially reflected by subsurface seismic reflectors (i.e., interfaces between subsurface lithologic or fluid layers characterized by different elastic properties). The reflected signals (known as "seismic reflections") are detected and recorded by seismic receivers located at or near the surface of the earth, thereby generating a seismic survey of the subsurface. The recorded signals, or seismic energy data, can then be processed to yield information relating to the lithologic subsurface formations, identifying such features, as, for example, lithologic subsurface formation boundaries.

Typically, the seismic receivers are laid out in an array, wherein the array consists of a line of stations each comprised of strings of receivers laid out in order to record data from the seismic cross-section below the line of receivers. For data over a larger area and for three-dimensional representations of a formation, multiple single-line arrays may be set out side-by-side, such that a grid of receivers is formed. Often, the stations and their receivers are spread apart or located in remote areas. In land seismic surveys for example, hundreds to thousands of receivers, called geophones, may be deployed in a spatially diverse manner, such as a typical grid configuration where each line extends for 5000 meters with receivers spaced every 25 meters and the successive lines are spaced 500 meters apart. Depending upon many geophysical factors, as well as operational down time due to equipment or weather conditions, the spread units may be deployed for time intervals in excess of two weeks.

Acoustic waves utilized in se1sm1c exploration are typically generated by a centralized energy source control system that initiates an energy event via a dynamite explosion, air gun shot, vibrator sweep or the like. The acquisition system, i.e., the seismic receivers and their control mechanism, is synchronized to the energy event such that the first data sample of the acquisition period corresponds in time to the peak of the energy event, such as the start of a sweep for vibratory operations. Acquisition periods typically last between 6 to 16 seconds following the first sample, with each seismic sensor being sampled at an interval between 0.5 to 4 milliseconds.

Of fundamental importance to any seismic system is the time base method by which the synchronization of the energy event and the sampling of the acoustic wave field is accomplished. FIG. 1 represents the principal elements involved in a typical prior art a seismic acquisition system 10 which is connected via a hardwire 12 to a plurality of individual seismic data acquisition sensors 14. The elements are utilized to control the time base and distribute the time base to each individual seismic data acquisition sensors 14, thereby permitting the overall system 10 to be time synchronized. As shown, the prior art uses a single, centralized time base which insures that all individual seismic data acquisition sensors 14 are sequenced during the acquisition cycle by the same time reference. The synchronization time reference is maintained at a centralized base unit 16, such as an operation management vehicle. This time base is typically disciplined by a continuously operated wireless receiver 18, such as a global positioning system ("GPS") receiver, which is disposed to communicate with an external time reference 20, which in the case of a GPS receiver are GPS satellites. The GPS receiver 18 directly disciplines a high stability voltage control oscillator ("VCO") 22 that is used to drive the system clock 24 to which all elements are typically phased-locked. The acquisition system controller 26 utilizes a Phase-Locked-Loop (PLL) to synchronize its outbound command frames to the system clock 24. The outbound command frames are in turn locked onto by the PLLs in the plurality of seismic data acquisition sensors 14 cabled to the acquisition system controller 26. Embedded in the command frames is the sample clock signal used to synchronize the analog-to-digital (A/D) converters 28 in the sensors 14 to the GPS signal, which is typically 1 Pulse-Per-Second (1 PPS) signal or any time interval that is an integer multiple of sample intervals following that time epoch. In any event, the energy source controller 30 is synchronized to the system clock 24 via discrete hardware interfaces that are either directly connected to the centralized GPS disciplined clock 24 or will utilize a PLL locked on to the central timing reference provided by the system clock 24. It is important to note that most prior art source control systems do not utilize GPS disciplined time bases to perform timing functions, but rather, use GPS time tags to time stamp certain significant events recorded by the system, such as reception of the FIRE event or the TIMEBREAK event (which represents the time of the peak source energy event) or the start of a vibratory sweep. The prior art acquisition system controller steers the time at which the FIRE event occurs to insure that the TIMEBREAK event occurs at a time synchronous with an A/D conversion of the spread seismic sensors, as required for accurate wave field sampling.

In contrast to the hardwired, centralized time base system of FIG. 1, more recent prior art seismic acquisition systems have attempted to eliminate or minimize cabling between the centralized base unit and individual seismic data acquisition sensors. In such cases, the seismic sensors are integrated with other hardware in individual seismic data acquisition units or nodes, such that some of the control and operational functions previously carried out by the base unit are now performed at the individual seismic data acquisition units, such as timing functions. In certain of these "nodal" prior art systems, each seismic data acquisition unit continues to communicate wirelessly with the centralized base, whereas in other "autonomous" nodal prior art systems, each seismic data acquisition unit operates independently of the centralized base.

The principal elements involved in a typical prior art "nodal" seismic acquisition system that utilizes autonomous seismic data acquisition units are similar to the block diagram shown in FIG. 1, except that physical layer connection (either wired or wireless) between a centralized unit and the field spread of seismic units is eliminated, such that the individual seismic acquisition units operate at least semi-autonomously from the central unit. In the case of elimination of a wired physical layer connection, many of the drawbacks arising from cables are eliminated, such as weight, cost and high failure rates. Likewise, in the case of elimination of a wireless physical layer connection, many of the drawbacks arising from a wireless connection are eliminated, such as bandwidth limits, susceptibility to interference, and the need for radio channel licenses.

These autonomous seismic acquisition units are characterized by one or more seismic sensors that are deployed in a spatially distributed array about the node. Each individual sensor is in communication with the node via a cable. Commonly, multiple sensors are wired to a single cable to create an array.

One significant improvement in autonomous seismic data acquisition is the development of fully integrated, self-contained autonomous seismic acquisition units, such as those described in U.S. patent application Ser. Nos. 10/448,547 and 10/766,253. In these applications, there is described a continuous recording, self-contained, autonomous wireless seismic acquisition unit. The self-contained unit comprises a fully enclosed case having a wall defining at least one internal compartment within the case; at least one geophone internally fixed within said internal compartment; a clock disposed within said internal compartment; a power source disposed within said internal compartment; and a seismic data recorder disposed within said internal compartment, wherein each of said electrical elements includes an electrical connection and all electrical connections between any electrical elements are contained within said case. Thus, unlike the prior art, the seismic sensors or geophones, are also contained within the case itself, rendering the entire system self-contained and eliminating external wiring or cabling of any type. The case is shaped to enhance deployment and coupling with the ground by maximizing the surface area of the case in contract with the ground. Preferably, the case comprises a first plate having a first periphery and a second plate having a second periphery, wherein the plates are joined along their peripheries by the wall defining the internal compartment. As such, the case may be disk shaped or tubular in shape. Such a unit is desirable not only for the shape of the case, but also because being fully self-contained, external cabling, such as between an electronics package and a seismic sensor/geophone, are eliminated.

In any event, when the physical layer connection with a centralized unit is eliminated, the autonomous seismic units must be implemented with a distributed time base, meaning that a control clock system is disposed on each individual seismic unit. Moreover, without a cable connection for synchronization or data telemetry, autonomous nodal seismic systems must rely on the use of battery based power sources for the individual seismic unit electronics. Wireless seismic acquisition units such as these operate independently of the energy source control system and the timing clock associated therewith. Rather, they rely on the concept of continuous acquisition of a timing signal, and in the case of the referenced patent application above, the continuous acquisition of data as well. Knowing that the source event is synchronized to the sample interval of the seismic data, the data can be associated with the correct source event in a non-real time process following the retrieval of the node.

With the elimination of the physical layer connection for distributed wireless seismic acquisition units, the manner in which each seismic unit's sample clock is derived and the synchronization of that sample clock with the energy source events must address the loss of the command frame synchronization of the prior art system in FIG. 1.

In the prior art, autonomous seismic acquisition units commonly synchronize and discipline their local time bases using the same method and apparatus implemented by the centralized time base architecture systems. Specifically, synchronization is accomplished by implementing a wireless interface to a continuous, common time reference, such as a GPS system of satellites. In such case, the GPS satellite time base is utilized as the system clock via a GPS receiver installed on board each individual seismic acquisition unit as opposed to a GPS receiver installed on board the centralized unit. However, such a time base system for autonomous units is undesirable for a number of reasons.

First, systems with continuously operating functions, such as a clock, utilize significant amounts of power. While a centralized unit may have access to a continuous power source, autonomous seismic acquisition units do not, but must rely on power source with limited capacity, namely a battery. Specifically, the use of a continuously operated wireless receiver to discipline a VCO is very power inefficient. For example a continuously operated GPS receiver could consume between 20 to 50 percent of the total battery power of a seismic unit. To address this, prior art acquisition systems most commonly utilize the "stand alone" node described above, wherein a plurality of seismic sensors are deployed in a spatially distributed array about the node, with each sensor in communication with the node via a cable. While such systems distribute the power load of a continuously disciplined clock across multiple seismic sensors, such a system reintroduces the use of unreliable cables to connect the spatially distributed seismic sensors. As the number of seismic sensors connected to an acquisition unit approaches one, however, the percentage of the total power budget of the unit utilized to maintain wireless synchronization becomes much more significant and power becomes a limiting factor governing the deployment length of the seismic acquisition unit.

Second, wireless access to the external time reference 20, will be significantly more difficult for nodal acquisition seismic units as compared to a receiver at a centralized base unit, such as a recording truck. The wireless receiver and antenna of a nodal seismic acquisition unit is located within the unit itself (or in close proximity thereto) and such units are generally deployed close to the ground (or in some cases may actually be below the ground surface). Moreover, physical placement of the unit is dictated by the geometry of the spread itself, and hence, physical placement cannot be altered to achieve better wireless access. Further, heavy foliage, rugged terrain and urban obstructions can all contribute to limiting the ability of the nodal wireless receiver to maintain a continuous timing solution. The result is that a continuous external time reference signal from a GPS satellite or other source is likely to be disrupted and intermittent over the course of a shoot. In contrast, a base unit such as a recording truck can generally be positioned in a location where wireless access to the time reference is unobstructed and not an issue.

With limited wireless access to the external time reference 20, the nodal time bases must rely on the stability or "holdover" capabilities of the VCO in the control loop to maintain a stable frequency output during periods when the control loop does not have a continuous reference to discipline the VCO. One prior art solution utilizes high stability ovenized or atomic based oscillators acting as the "holdover" time base. However, the cost and power requirements for such oscillators makes their use impractical. A more typical solution is to use a high stability, temperature compensated quartz oscillator as the "holdover" oscillator. This class of VCO can maintain a fixed frequency within ±5E-7 over the industrial operating range of a node.

A third drawback to implementation of an autonomous seismic acquisition unit utilizing a continuous GPS receiver as the system clock arises from the manner in which the wireless receiver corrects the frequency of the VCO following long periods of poor wireless availability. Current prior art methods cause distortion in the A/D process of the delta-sigma converters used in such acquisition units. The control loops implemented in these prior art GPS disciplined time bases are designed to steer the 1 PPS output of the disciplined clock to align with the GPS 1 PPS signal. This is accomplished by varying the frequency of the VCO to compensate for the time difference between the two 1 PPS references. The attack rates at which this frequency correction is performed is designed to minimize the time over which the correction is made so that the disciplined clock is rapidly brought back into synchronization with GPS time reference. While these GPS disciplined time bases typically allow some limited control of the attack rate of the control loops, thus providing some reduction in the distortion caused by the change in the VCO operating frequency, this reduction in the attack rate greatly increases the time interval over which the correction is made and over which the GPS receiver must remain in a high power consumption state.

There exist the need to establish a method by which autonomous nodal seismic acquisition units, distributed over wide spatial areas, can be synchronized to each other and to a seismic energy controller while minimizing power consumption of the units. Such a method must address the lack of either a wired or wireless physical layer connection between nodes or a control unit and must do so in a low power manner. The apparatus used to implement the time base interface to an external time reference, such as GPS, account for the intermittent and unreliable nature of the time base due to operational and environmental variables within which the unit must function. As such, it would be desirable to have a control loop design to implement the time base so as to stabilize oscillator performance when access to an external time reference is not possible. Control loop algorithms should adapt to oscillator performance charteristic and predictive methods should be used to avoid the need to access the external time reference during periods when there is a low probability of successfully connecting to the external time reference.

SUMMARY OF THE INVENTION

The present invention provides an apparatus to access a common time reference from a spatially distributed nodal seismic acquisition system and a method by which a low-power, synchronized time base within the distributed nodes can be established with limited access to the common time reference. The invention describes the control process of that apparatus which achieves the goals of a low power time base within the bounded synchronization error tolerances that are geophysically acceptable.

The invention provides an apparatus and method to permit utilizing of an external precision time base in wireless nodal seismic acquisition units while conserving the unit's batter power. More specifically, the invention provides for non-continuous access via intermittent operation of an on-board wireless receiver to an external precision time base to aperiodically tune open loop variables and to correct for synchronization errors resulting from stability limitations of the open loop approach. The invention further provides a method for correction of drift error between a local clock and the external precision time base.

The portions of the seismic unit that relate to the time base generally include a wireless receiver that interfaces with a node controller that tunes an adjustable timing signal device capable of producing an adjustable timing signal that drives a disciplined sample clock used to provide timing to an A/D delta-sigma converter. The node controller implements an open loop control algorithm that accounts for one or more internal or external environmental conditions that impact the unit, such as external temperature, tilt, voltage, crystal aging and the like, to estimate the VCO frequency and correct for the estimated frequency error. Thus, the unit preferably includes various sensors such as a temperature sensor, a voltage sensor and/or a tilt sensor. In one preferred embodiment, historical frequency characteristics of the VCO are stored along with the associated environmental sensor values in a frequency compensation table and used to stabilize the frequency. In addition to synchronizing the local time base, the wireless receiver is also utilized to provide a precision time stamp to local events when the wireless receiver is in operation. Measured environmental sensor values can be utilized to predict when the wireless receiver should be activated to acquire a signal for tuning purposes.

In correcting for drift error, the drift between the timing reference and the sample clock is measured using time stamping of the sample clock via the wireless receiver. The wireless receiver is then placed into a low power sleep mode and the frequency of the VCO is intentionally offset from its nominal value to either increase or decrease the frequency of the VCO and the synthesized sample clock, in order to reduce the drift value. To minimize distortion in the sampled data of the acquisition system that is phase locked to the VCO, a small offset (<±1E-6), long duration correction is implemented. The length of time that the drift correction offset is applied is a linear function of the size of the drift to be corrected and the amount by which the VCO's frequency is offset. Following the removal or reduction of the accumulated drift, the continuous open loop frequency compensation process is still in operation to maintain high VCO stability until the next drift correction process is executed.

While the invention could be used for any type of seismic unit, wired or wireless, autonomous or communicating with a central base, in the preferred embodiment, the invention is utilized with continuously recording, autonomous seismic data acquisition units that operate independently of other units. In one preferred embodiment, the autonomous seismic data acquisition unit is comprised of a fully enclosed, self-contained case having a wall defining at least one internal compartment within which are fixed at least one seismic sensor, non-volatile storage, a power supply sufficient to permit continuous operation of the unit and operating electronics, including the foregoing electronics utilized for the time base. The case is preferably constructed of a first plate and a second plate joined along their peripheries by the wall defining the internal compartment, thereby resulting in an overall disk shape or tubular shape.

DESCRIPTION OF THE PREFERRED EMBODIMENTS

Figure 1:
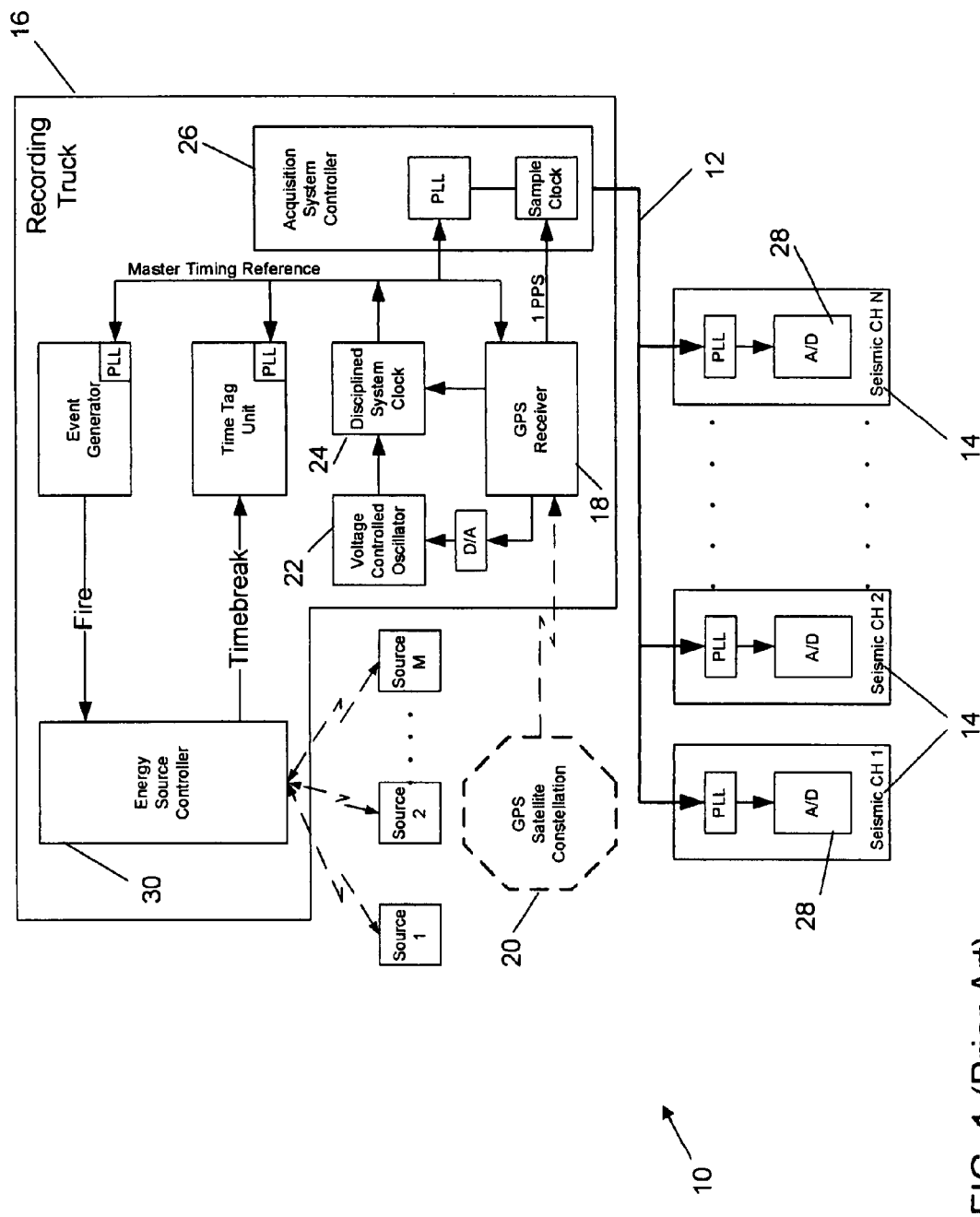
FIG. 1 is a system block diagram of a prior art cabled seismic data acquisition system that utilizes a single centralized time base for system operation.
Figure 2:
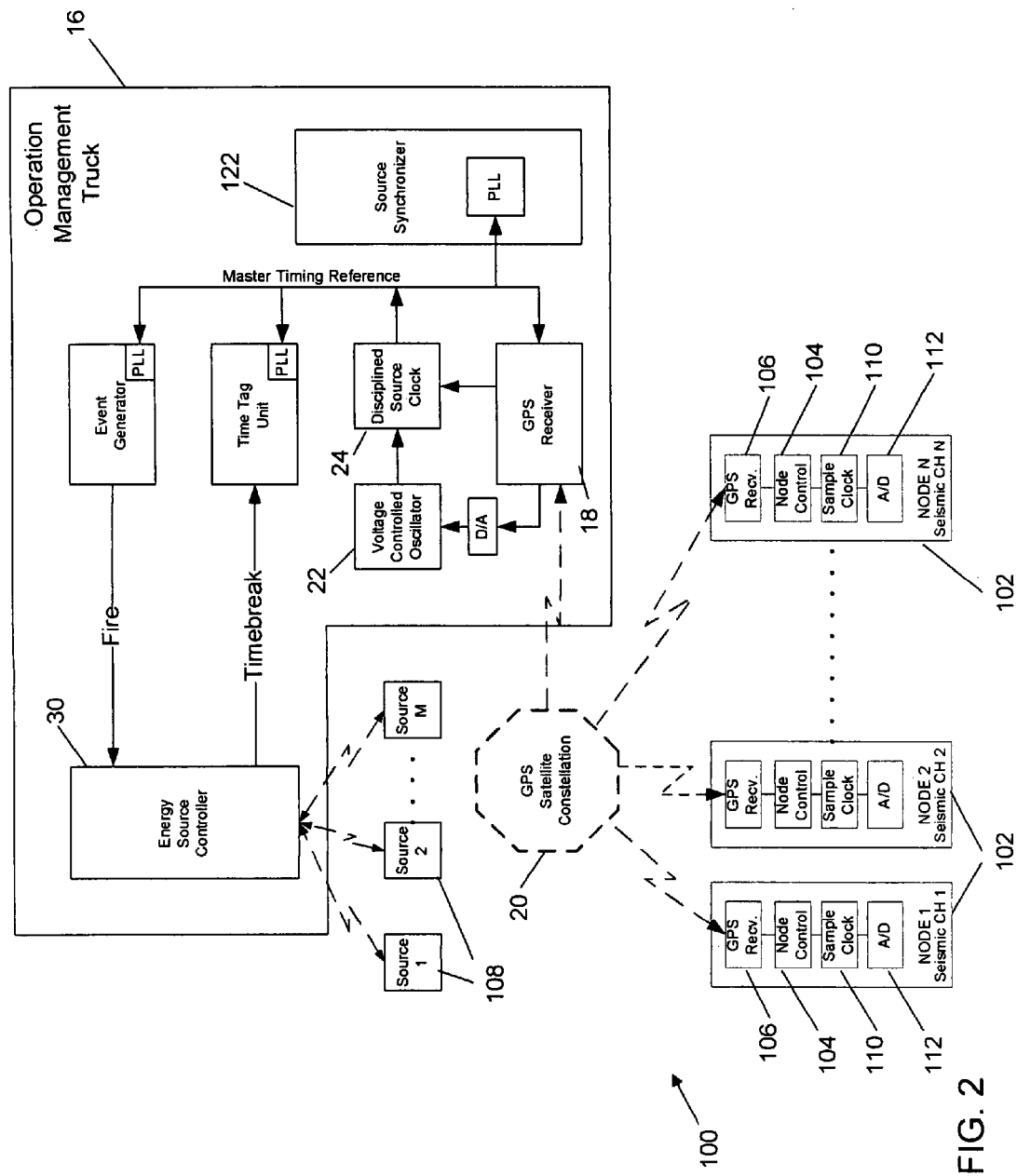
FIG. 2 is a system block diagram of a nodal seismic data acquisition system that utilizes an external, common distributed time base for synchronization of the system operation.

The invention is implemented in a seismic acquisition unit such as that shown in FIG. 2, namely wireless nodal seismic acquisition unit. Specifically shown in FIG. 2 is a system level architectural block diagram of a seismic survey system 100 that utilizes a distributed time base from an external timing reference to synchronize a plurality of autonomous, individual seismic data acquisition units 102. The distributed time base insures that all individual seismic data acquisition units 102 are sequenced during the acquisition cycle by the same time reference. While the seismic survey system 100 of FIG. 2 is similar to the prior art seismic survey system 10 of FIG. 1, the system 100 of FIG. 2 is autonomous, without any wired or wireless physical layer connection with the centralized base unit 16, i.e., no control signal from the base unit. Rather, each individual seismic acquisition unit 102 includes a wireless receiver on board that communicates with an external, precision time reference or base 20, such as GPS satellites, to discipline the local time base of each unit 102. Likewise, while the seismic survey system 100 of FIG. 2 has some similarity to some autonomous prior art seismic acquisition units, the prior art units utilize the precisions satellite time base as the system clock itself, thereby creating many of the drawbacks set forth above. As shown in FIG. 2, however, each individual seismic acquisition unit 102 of the invention includes both a wireless receiver 106 and a local sample clock 110 configured to be disciplined, via a local controller 104, by wireless receiver 106.

In FIG. 2, the synchronization of the energy source 108 to the time reference is done in much the same fashion as the prior art system 10 shown in FIG. 1. However, the energy source control 30 of the system 100 is logically, as well as physically, disassociated with the seismic acquisition units 102 and can be located anywhere convenient for the operating crew. The acquisition system controller of FIG. 1 is replaced by a source synchronizer component 122 that insures that the TIMEBREAK signal from the energy source controller 30 is on a sample interval boundary relative to the GPS 1 PPS epoch. The distributed nodal seismic acquisition units 102 access the same common time reference used by the source control portion 120 of the system to insure synchronization within the survey system 100.

Figure 3:
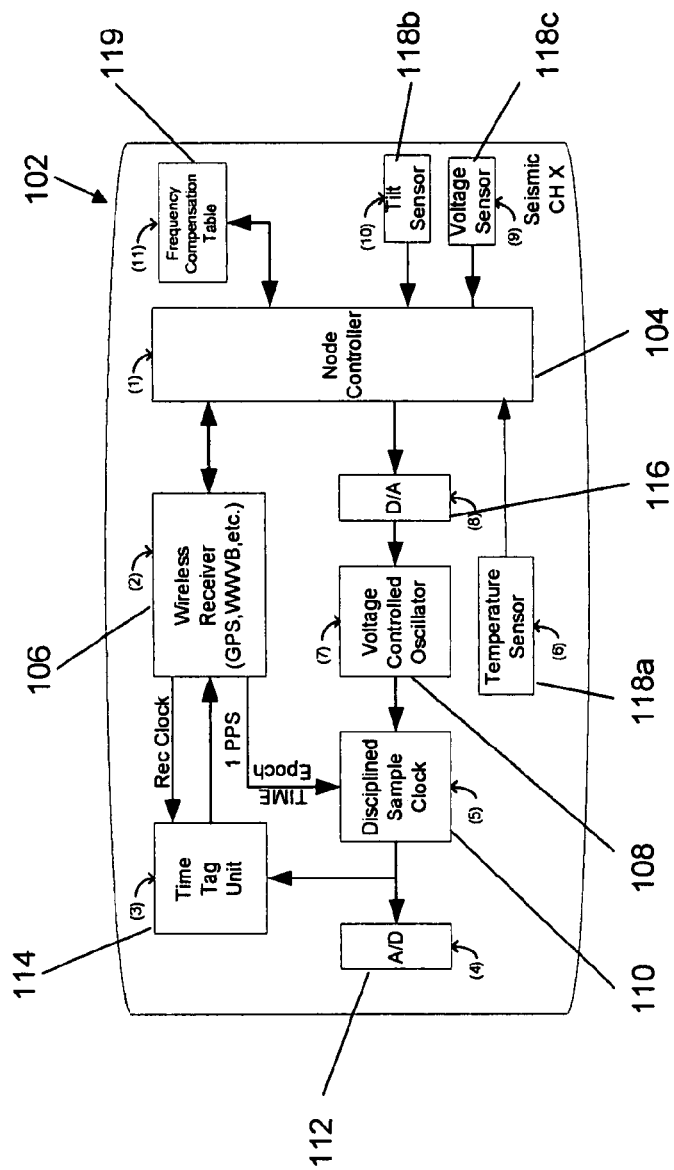
FIG. 3 is a schematic view of the time base elements of the present invention.

One embodiment of the synchronized, distributed time base in a nodal seismic data acquisition unit 102 is shown in FIG. 3. While only those elements related to the time base portion of the nodal unit is shown, the complete unit 102 includes a seismic sensor, sufficient non-volatile storage and battery driven power supplies to permit continuous operation for time frames greater than two weeks, and preferably during the entire deployment of the units 102. Further each seismic acquisition unit includes one or more seismic sensors, such as geophones. Preferably, all of the foregoing electrical components are housed in a fully enclosed case having a wall defining at least one internal compartment within the case and in which the components are secured. Those skilled in the art will appreciate that said electrical components include electrical connection interconnecting the foregoing, and it is preferred in the embodiments of the invention that all electrical connections between any electrical components are contained within the case, rendering each data acquisition unit 102 entirely self-contained and eliminating external wiring or cabling of any type.

While the case may have any shape, preferably the case is shaped to enhance deployment and coupling with the ground by maximizing the surface area of the case in contract with the ground. In one embodiment, the case comprises a first plate having a first periphery and a second plate having a second periphery, wherein the plates are joined along their peripheries by the wall defining the internal compartment. The wall may be cylindrical so that the case may have an overall disk shape or tubular shape.

Non-continuous access to a high precision time reference is aperiodically required to tune the open loop variables and to correct for synchronization errors resulting from stability limitations of the open loop approach.

While the invention will be described in terms of a precision satellite time base such as GPS, in other non-limiting embodiments, the source of the external time reference to which each system or subsystem is synchronized could be implemented with other time references such as WWVB or dedicated propitiatory UHF/VHF time broadcasts. The invention is not associated with any specific time epoch, but preferably all nodes and system elements must share a common epoch for synchronization of the acquisition processes.

In FIG. 3, a diagram of the local time base of a nodal seismic data acquisition unit 102 according to the present invention is shown. The portions of the seismic unit 102 that relate to the time base generally includes a node controller 104, a wireless receiver 106, an adjustable timing device 108, such as a voltage controlled oscillator (VCO), a disciplined sample clock 110, an A/D delta-sigma converter 112 and a time tag unit 114. A D/A converter 116 (preferably 16 bit) is used to provide analog control voltage to VCO I 08 from node controller 104. One important aspect of the invention is the utilization of environmental sensor 118 and a frequency compensation table 119 as described in more detail below. While the adjustable timing device 108 will be described as a voltage control oscillator, those skilled in the art will appreciate that such a device could be any oscillator cable of functioning as described herein, including without limitation, a voltage controlled crystal oscillator, a voltage controlled temperature compensated crystal oscillator (VCTCXO) or a voltage controlled oven controlled crystal oscillator (VCOCXO).

Generally, disciplined sample clock 110 is used to directly clock the A/D delta-sigma converter 112. The time reference for the sample clock 110 is provided by local VCO 108, the frequency of which is controlled by local node controller 104 (as opposed to VCO controlled directly by a wireless receiver as done in prior art systems). It is the local node controller 104 and the functionality that it provides which is one of the points of novelty of the invention. Since the wireless receiver 104 is not disciplining the local VCO 1 08, seismic acquisition unit 102 can utilize a low power state to conserve power during operation. For purposes of this disclosure, "low power state" refers to a state in which wireless receiver 106 is not communicating with precision time base 20. Without a direct, continuous access to an external time reference, the local node controller 104 cannot directly measure the VCO 108 frequency nor determine the frequency error of VCO 108. Rather, the node controller 104 will implement an open loop control algorithm that accounts form one or more internal or external environmental conditions that impact unit 102, such as external temperature, tilt, voltage, crystal aging and the like, to estimate the VCO frequency and correct for the estimated frequency error. Such environmental conditions may be measured by one or more environmental sensors 118. Preferably, sensors 118 are low power, continuously operated sensors, such as for example, temperature sensor 118a, tilt sensor 118b and/or voltage sensor 118c, operating in a open loop control process that enhances oscillator stability without the need for a high precision, high power, continuously operated time reference. Without limiting the types of environmental sensors that might be utilized in the invention, the environmental variables that are anticipated to have the most significant effect on the stability of the operating frequency of the VCO used in the local time base include temperature, vertical orientation and VCO power supply voltage, wherein temperature generally is the most significant of these factors. In various embodiments of the invention one or more variables may be used to estimate the VCO operating frequency. Those skilled in the art will appreciate that each environmental variable may generally contribute to the overall instability of the VCO and are preferably accounted for in implementing the invention. The frequency error, temperature, inclination and power supply voltages of the oscillator are stored into a frequency compensation table 119, preferably utilizing non-volatile memory, for use in disciplining VCO 108. The table may consist of an array of dimension N where N is the integer quotient of the apparatus operating environmental condition range divided by a fixed environmental condition binning range.

Table 1 lists typical stability factors for a typical low cost, low power crystal oscillator.

TABLE I

Typical Crystal Oscillator Stability Variables

| Environmental Variable | Stability (ppb) | Range |
| --- | --- | --- |
| Temperature | ±500 | −20-70° C. |
| Voltage | ±200 | ±5% Vcc |
| Tilt | ±2 | ±180° X or Y plane |

From this table it is obvious that temperature has the most significant effect on stability of the VCO, but even the inclination or tilt of the oscillator could result in excess of 100 uSec synchronization error over a 14 hour interval if not compensated for by the open loop controller managing the VCO.

In order to implement the open loop control algorithm, node controller 104 must establish an accurate association between the measurable environmental variables and the resulting frequency error of the VCO 108. In order to initially synchronize the local time base and to measure the frequency error of VCO 108, node controller 104 must have access to an external high accuracy time reference. Access to the external time reference is provided by wireless receiver 106. While wireless receiver 106 is not used as the system clock as it is in the prior art, wireless receiver 106 serves two purposes in this embodiment of the invention: first, it is used to provide the initial 1 PPS epoch to which the sample clock 110 is synchronized, and second, it is used to provide an accurate time stamp, via time tag unit 114, of the A/D's sample clock.

Figure 4:
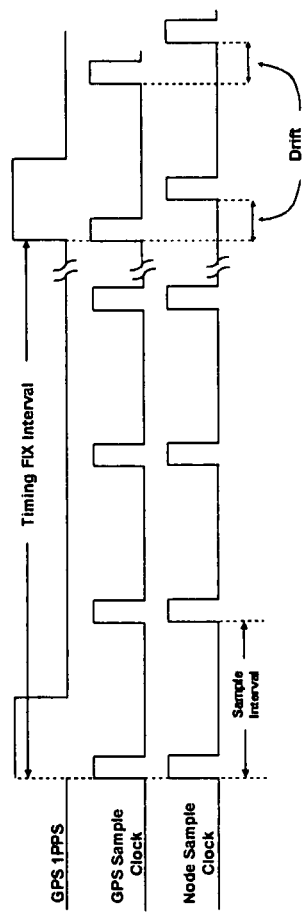
FIG. 4 is a timing diagram of the phase relationship between the nodes sample clock and the external timing reference epoch (GPS 1 PPS in this example) at the point at which they are synchronized as well as one possible phase relationship at an arbitrarily time latter.

FIG. 4 illustrates the initial synchronization of the sample clock to the time reference epoch (GPS 1 PPS in the example of FIG. 4), as well as the divergence of the sample clock and the time reference over an arbitrary period of time. The difference in the time stamps between two sample clocks is used to determine the frequency error of the VCO. As mentioned above, the frequency error, temperature, inclination and power supply voltages of the oscillator are stored into a frequency compensation table 119 for use in disciplining the oscillator. In doing so, node controller 104 is continuously learning the characteristic of the oscillator's frequency stability as a function of the environmental variables. The open loop controller that disciplines the VCO 108 then utilizes this functional relationship to control the frequency of the oscillator. Preferably, the time interval between frequency measurements is maximized to reduce the amount of time that the seismic acquisition unit 102 is in its high power operating state, i.e., when the wireless receiver 106 is being utilized. Node controller 104 utilizes an adaptive algorithm that maximizes the calibration interval based on the previously measured oscillator stability and the change in the amplitude of the environmental sensors 118. The interval will be longer for more stable oscillators and the interval will be shorter for less stable oscillators. While this adaptive and aperiodic interval based on the stability of the oscillator is one preferred implementation of the invention, the interval may also be determined at regular time intervals or whenever there is a change in the environmental parameters.

Regardless of the level of frequency stability that can be realized by the open loop controller that is disciplining the VCO, there will always exist some instability that will result in frequency divergence of the local VCO 108 and the external time reference 20. This divergence is primarily due to stability tolerances in the VCO oscillator and must be corrected prior to the magnitude of the divergence exceeding a geophysically significant amount. In FIG. 4 this divergence is referred to as "drift". The correction method for the drift error is a separate process from the continuous VCO frequency correction method. While each method can be practiced independently of one another in a seismic acquisition unit, in the preferred embodiment, both methods are utilized in the seismic acquisition units of the invention. Drift correction requires the availability of the external timing reference 20 (GPS in this example) to measure the drift and does not use any of the environmental sensors in the correction algorithm.

Figure 5:
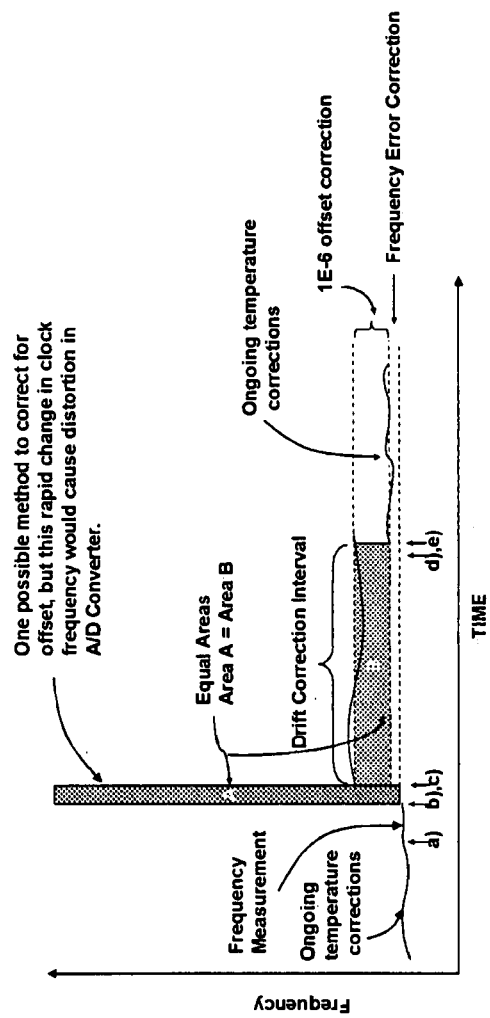
FIG. 5 is a timing diagram that presents one method by which the clock calibration process of the invention can be implemented without causing distortion in the sampled seismic data.

FIG. 5 is an example of the clock calibration process that includes an example of how the drift is removed from the sample clock 110 of FIG. 3. The drift between the timing reference and the sample clock 110 is measured using time stamping of the sample clock 110 via the GPS receiver 106. The GPS receiver is then placed into a low power sleep mode and the frequency of VCO 108 is intentionally offset from its nominal value to either increase or decrease the frequency of the VCO and the synthesized sample clock, in order to reduce the drift value. As shown in FIG. 5, this could be accomplished by offsetting the frequency by a large value for a short period of time (as at area "A") or by a small value for a longer time interval (as at area "B"). For the purpose of simply reducing the drift interval, the large frequency offset value would reduce the interval the most quickly, as show in Area A, as is done by existing GPS disciplined clocks such as those used in the prior art system shown in FIG. 1. However, a large change in VCO frequency creates distortion in the sampled data of an acquisition system that is phase locked to the VCO since the rapid change in the clock frequency creates in-band sampling noise in the A/D delta-sigma converters 1 12. Consequently, the invention provides for a small offset (<±1E-6), long duration correction, as shown in area B. The length of time that the drift correction offset of the invention is applied is a linear function of the size of the drift to be corrected and the amount by which the VCO's frequency is offset. Following the removal or reduction of the accumulated drift, the continuous open loop frequency compensation process is still in operation to maintain high VCO stability until the next drift correction process is executed. By avoiding an abrupt correction as is done in the prior art, but rather spreading a correction out over time, data distortion is minimized.

With reference again to FIG. 3, node controller 104 is interfaced with a wireless receiver 106. Node controller 104 is typically a microprocessor that implements algorithms involved in the initialization, control and logging processes associated with the local time base. Wireless receiver 106 provides access to an external, high accuracy time base 20, such as a GPS satellite constellation, WWVB, special radio signal or similar precision time base. Wireless receiver 106 performs two functions, namely synchronization of the local time base and time stamping local events, such as the time the A/D 110 converters sample clock 106.

The A/D sample clock 112 is sourced by the disciplined sample clock 110 which is synchronized to a time epoch (ex. 1 PPS) via the wireless receiver 106 and whose sample interval is set by the node controller 104. The disciplined sample clock 110 synthesizes the sample clock used by the A/D converter 112 from a frequency source provided by the VCO 108. The operating frequency of the VCO 108 is tuned by the control processes, executed on the node controller 104, by variations of the analog control input on the VCO 108. The 16 bit D/A converter 116 is used by the node controller 104 to provide the analog control voltage of the VCO 108. The open loop control process implemented on the node controller 104 utilizes environmental measurements provided by the temperature sensor 118a, voltage sensor 118c and/or the tilt sensor 118b in controlling the VCO 108. Historical frequency characteristic of the VCO 108 is stored along with the associated environmental sensor values in the frequency compensation table 119 located in non-volatile storage.

The node controller 104 initializes the local time base by first establishing a reliable connection via the wireless receiver 106 to the external common time reference used by all nodes and subsystems in the seismic system. The node controller 104 calibrates the response of the VCO 108 to changes in the analog voltage applied by the D/A converter 116 and stores the resulting scale value for later use in the correction process. The wireless receiver 106 will replicate a local version of a time epoch (ex. 1 PPS) utilized by all nodes and subsystems to which the disciplined sample clock 110 will be synchronized. The disciplined sample clock 110 will synthesizes a repeating Sample Clock at the rate specified by the node controller 104 which is used by the A/D converter 112 to convert the analog representation of the seismic sensor into a digital format. Following initial synchronization of the external time epoch and the Sample Clock the wireless receiver 106 can be placed into a low power state to conserve battery resources and the Frequency Compensation process on the node controller 104 is enabled.

The frequency compensation process, utilizing frequency compensation table 119, is periodic executed on the node controller 104 and implements an "open loop" control algorithm utilizing an empirically determined relationship between various environmental variables and the operating frequency of the VCO 108 to maximize the stability of the frequency output of the VCO 108. An open loop control process uses indirect feedback to discipline the output frequency since a direct measurement of the frequency would require access to an accurate frequency or time reference. This would, in turn, require the use of the wireless receiver 106 which consumes limited battery power resources. The open loop controller is driven by the current values provided by the temperature sensor 118a, voltage sensor 118c and tilt sensor 118b, as well as the historical performance characteristic of the VCO 108 in the frequency compensation table 119. One possible structure of the frequency compensation table 119 is shown in Table 2. The frequency compensation table 119 can be viewed as a linear array index by the current ambient operating temperature of the node. The operating temperature range of the node is segmented into small range temperature bins (2 degree Celsius for the example in Table 2) which contain the time that the last frequency error measurement of the VCO 108 was made within the temperature range of the bin. Also stored in the bin is the actual temperature when the frequency was measured, the environmental variables and the resulting frequency error of the VCO 108.

TABLE 2

| Frequency Compensation Table Structure Temperature Bin - Deg C. | | | | | | | | | | | | | | |
| --- | --- | --- | --- | --- | --- | --- | --- | --- | --- | --- | --- | --- | --- | --- |
| <−40 | −40--−38 | −38--−36 | −36--−34 | ... | −4--−2 | −2--0 | 0-2 | 2-4 | 4-6 | ... | 74-76 | 76-78 | 78-80 | >80 |
| Time Avg Temp Voltage Tilt Freq Error | Time Avg Temp Voltage Tilt Freq Error | Time Avg Temp Voltage Tilt Freq Error | Time Avg Temp Voltage Tilt Freq Error | Time Avg Temp Voltage Tilt Freq Error | Time Avg Temp Voltage Tilt Freq Error | Time Avg Temp Voltage Tilt Freq Error | Time Avg Temp Voltage Tilt Freq Error | Time Avg Temp Voltage Tilt Freq Error | Time Avg Temp Voltage Tilt Freq Error | Time Avg Temp Voltage Tilt Freq Error | Time Avg Temp Voltage Tilt Freq Error | Time Avg Temp Voltage Tilt Freq Error | Time Avg Temp Voltage Tilt Freq Error | Time Avg Temp Voltage Tilt Freq Error |

The open loop controller will develop an interpolating equation relating the Frequency Error and Average Temperature value for the bin matching the current operating temperature and the bin whose Average Temperature is next closest to the current operating temperature. The resulting equation is then solve using the actual current operating temperature to estimate the Frequency Error to be corrected. The open loop controller uses the estimated Frequency Error, as well as the scale value calculated during the initialization process, to adjust the control voltage on the VCO 108 to improve the stability of the frequency of the oscillator.

In order to correct for aging of the VCO 108, the open loop controller will request a new measurement of the frequency if the last measurement was perform over 5 days prior to the current time. An update of the frequency error value will also be requested if the current Voltage level of the oscillator is different by more than ±0.5% or if the current Tilt Value is more than ±15 degrees different from the values in the bin.

Measurement of the Frequency Error of the oscillator requires the availability of the external time reference provided by the wireless receiver 106. The frequency error is calculated by measuring the drift shown in FIG. 4 over an accurate time interval. The equation below is used to calculate the frequency error of the VCO 108.

$$\text{FreqError} = (F\text{Nominal} \ast (\text{Drift1} - \text{Drift2}) / (T2 - T1)) \quad \text{Eq 1}$$

Where FreqError is in Hertz, FNominal is the ideal or target frequency desired for the VCO 108 in Hertz, Drift1 and Drift2 and T1 and T2 are in seconds. The time interval between the measurement of the first drift value (Drift1) and the second value (Drift2) is the value T2−T1. The required length of this measurement interval is a function of the desired accuracy of the frequency error measurement and the accuracy with which the drift values can be measured. Equation 2 is used to calculate the required interval over which the frequency error is measured.

$$MI = 2 \ast ME \ast (F\text{Nominal} + FT) / FT \quad \text{Eq. 2}$$

Where MI (Measurement Interval) and ME (Measurement Error) are in seconds and FNominal and FT (Frequency Tolerance) are in Hertz. For example if the FNominal frequency is 10.24 MHz, ME is 55 nSec and FT is 5 mHz then the measurement interval would need to be at least 226 seconds. The wireless receiver 106 is placed into its low power sleep state during this interval to conserve power resources.

The foregoing process describes the Frequency Compensation method of the invention provided to permit local clock calibration using a external time base to which access is non-continuous or intermittent. This forms one of the points of novelty of the invention in that the corrections are preferably "aperiodic" based on analysis of environmental conditions and their effect on the local timing based intermittently derived from the external time base. In addition, the invention provides for a method of Drift Correction for the local timing device of the seismic data acquisition unit. The Drift Correction method can be used in conjunction with or independently from the Frequency Compensation method.

Preferably, whenever the Frequency Compensation method is applied and the frequency compensation table 119 is updated with a new measurement of the Frequency Error, the Drift Correction method is applied. When the frequency compensation table is updated, the drift of the sample clock relative to the external time base is measured. This drift, shown in FIG. 4, must be removed in order to keep the sample clocks within a specified tolerance. FIG. 5 is an example of the clock calibration process which includes a drift correction process as well as the frequency error measurement process of the VCO 108 as described in the frequency compensation process above.

Figure 6:
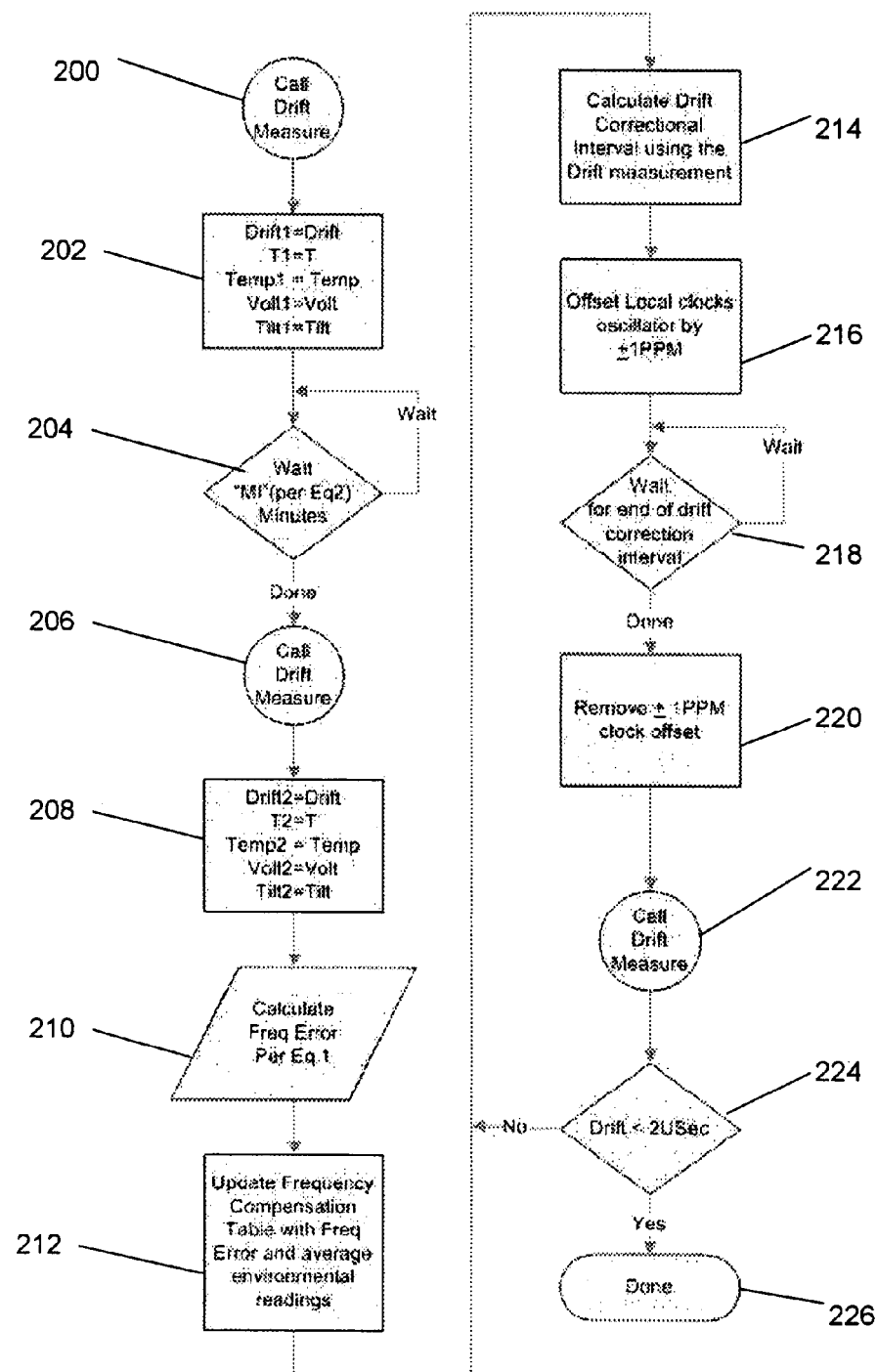
FIG. 6 is a flowchart of the drift correction process of the invention.
Figure 7:
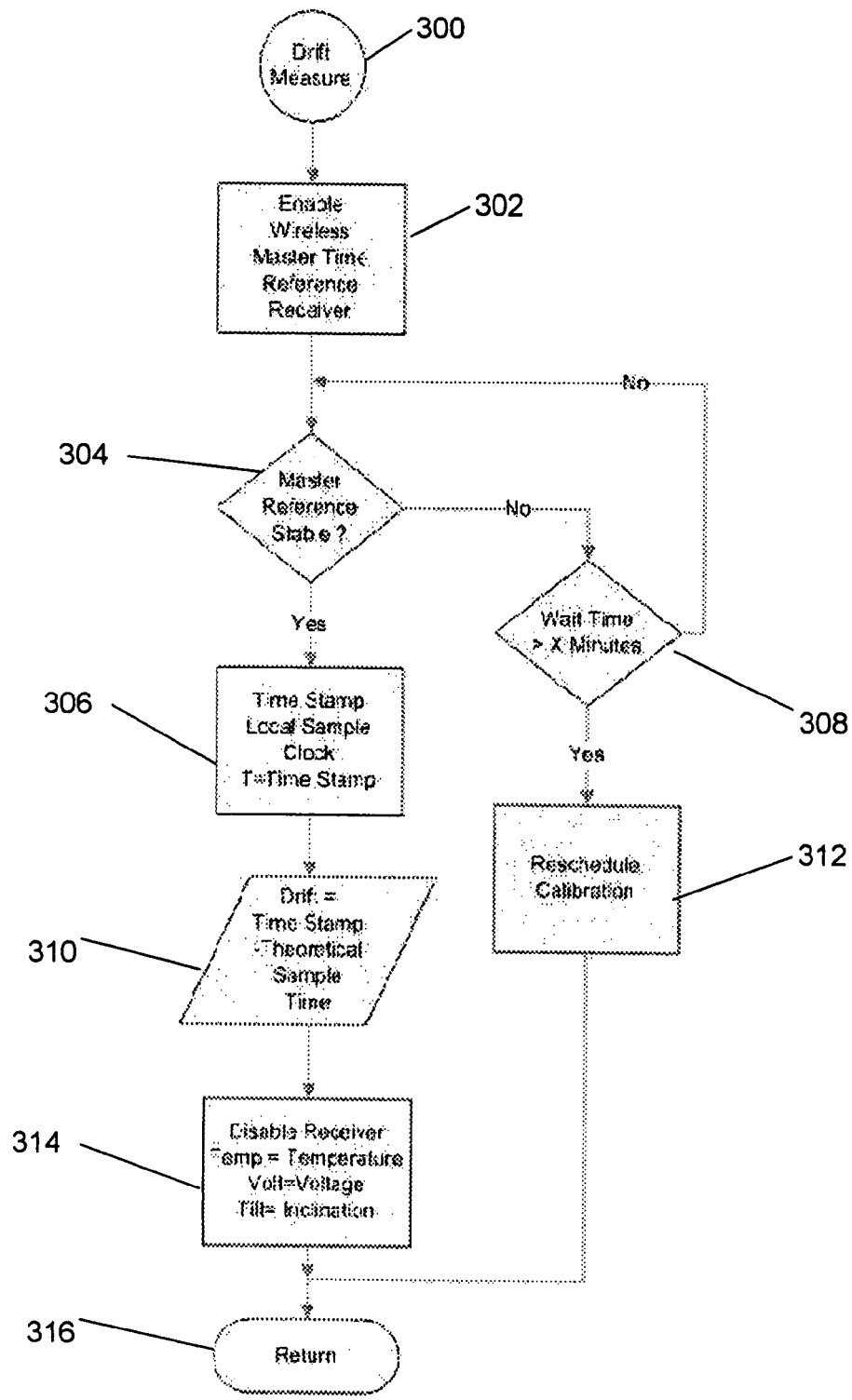
FIG. 7 is a flowchart of the steps utilized to maximize the interval between drift corrections.

The steps of the Frequency Compensation method and Drift Correction method are illustrated in the flowcharts of FIGS. 6 and 7. The following steps (a) and (b) embody the Frequency Compensation method, while steps (c), (d) and (e) embody the Drift Correction method:

a) Enable the wireless receiver 106 to receive the an external time reference and time stamp the local disciplined sample clock 110 (Step 200). Calculate the Drift1 (Step 202) of Eq. 1. The difference in time between the time stamp of Step 200 and a theoretical time that the sample clock should have occurred is the Drift1 measure. Record the current values of relevant environmental factors (Step 202), such as values from the temperature sensor 118*a*, voltage sensor 118*c* and the tilt sensor 118*b*. Disable the wireless receiver 106 to conserve power and wait a time interval at least greater than the interval calculated using Eq. 2 (Step 204).

b) Enable the wireless receiver 106 to receive the an external time reference and time stamp the local disciplined sample clock 110 (Step 206). Calculate the Drift2 and associated environmental values (Step 208). The difference in time between the time stamp of Step 206 and the theoretical time that the sample clock should have occurred is the Drift2 measure in Eq. 1. The difference between the two time stamps is the interval T2−T1 of Eq. 1 from which the frequency error may be calculated (Step 210). Calculate the average for the various environmental values of the unit, such as temperature, voltage and tilt over the measurement interval. Disable the wireless receiver 106 to conserve power. Update the frequency compensation table 119 with the current time and the average values of the environmental variables (Step 212). Insure that the frequency compensation process updates the operating frequency of the VCO 108.

c) Based on the Drift2 measurement, calculate the time length, i.e., the Drift Correction Interval, required to eliminate this drift value if the frequency of the VCO 108 was offset by ±1E-6 times the nominal frequency of the VCO 108 (Step 214). Offset the frequency of the VCO 108 by the ±1 E-6 shift (Step 216) and wait for the completion of the Drift Correction Interval (Step 218).

d) Enable the wireless receiver 106 to receive the an external time reference and time stamp the local disciplined sample clock 110 (Step 222). Power down the wireless receiver 106. The difference in time between the time stamp of Step 222 and the theoretical time that the sample clock should have occurred is the third drift measurement. This third drift measurement value should be close to zero. In Step 224, a determination is made whether the value is acceptable or whether the drift correction process needs to be performed again. If outside of a ±2 uSec interval then the process needs to be performed again. A new Drift Correction Interval should be calculated following the steps of the process and the ±1E-6 frequency offset should continue to be applied. It should be noted that the polarity of the offset may be different in those cases where the initial correction applied overshot the intended drift correction.

e) Remove the ±1E-6 drift correction frequency offset and continue to execute the periodic Frequency Compensation process (Step 226).

The interval between drift corrections needs to be kept at a maximum in order to minimize the activation of the wireless receiver 106 and thereby minimize power consumption. This interval is determined according to the process of FIG. 7 by an adaptive algorithm that calculates the average stability of the VCO 108 since the last drift correction and also over the last 24 hours of operation. Thus, the last drift correction is identified in Step 300. In Step 302, the wireless receiver 106 is enable to receive the an external time reference. Whichever stability value is the largest will be used to predict when the VCO 108 will exceed a predetermined percentage of the maximum synchronization interval. In one embodiment, the predetermined percentage is 70%. The next frequency compensation table 119 update and drift correction cycle is then schedule to be performed at this time. However, if the scheduled time falls into a time period during which access to the external time reference is known to be degraded, the calibration process will be scheduled to occur at a time prior to the calculated interval but outside of the known poor reception period. For example if the time reference is the GPS system and the downloaded Almanac indicates that no satellites would be available at the scheduled time X then the clock calibration process would be scheduled at time Y when multiple satellites would be available and where time Y is prior to time X.

Based on the foregoing, it will be appreciated that the method of the invention minimizes power consumption of autonomous seismic data acquisition units by only intermittently utilizing a wireless receiver to access an external precision timing reference. It will further be appreciated that the invention also addresses those instances where a wireless signal is not available for establishing a precision time reference.

While certain features and embodiments of the invention have been described in detail herein, it will be readily understood that the invention encompasses all modifications and enhancements within the scope and spirit of the following claims.

The invention claimed is:

1. A method of providing a stable timing signal for a seismic data acquisition unit, comprising:
generating, via a local oscillator of the seismic data acquisition unit, a local timing signal;
receiving, by a wireless receiver of the seismic data acquisition unit, an external time reference;
disciplining, via the wireless receiver, the local oscillator based on the external time reference;
determining a frequency error of the local oscillator by differencing time stamps of the external time reference over a frequency measurement time interval, wherein the frequency measurement time interval corresponds to a frequency accuracy for a variable time stamp uncertainty;
measuring, via at least one environmental sensor, at least one environmental parameter for the seismic data acquisition unit, the at least environmental parameter including an inclination of the seismic data acquisition unit;
storing, in a memory element of the seismic data acquisition unit, a data structure comprising (i) the frequency error, (ii) the time stamps from the external time reference, and (iii) measured environmental parameters encountered over the frequency measurement time interval; and
during a time interval in which the wireless receiver is disabled, adjusting a frequency of the local oscillator to correct for at least one timing error using data stored in the data structure.

2. The method of claim 1, further comprising:
determining an average of a plurality of measurements of the at least one environmental parameter; and
storing the average in the data structure.

3. The method of claim 1, further comprising:
enabling the wireless receiver to receive the external time reference during the frequency measurement time interval; and
disabling the wireless receiver at the end of the frequency measurement time interval by entering a low power state.

4. The method of claim 1, further comprising:
providing historical environmental characteristic data corresponding to the at least timing error; and
storing the historical environmental characteristic data in the data structure.

5. The method of claim 1, further comprising:
measuring, via the at least one environmental sensor, a temperature of the seismic data acquisition unit; and
storing, in the data structure, measured temperatures encountered over the frequency measurement time interval.

6. The method of claim 1, further comprising:
determining a current inclination and a current temperature of the seismic data acquisition unit;
determining a stored seismic data acquisition unit inclination corresponding to the current operation temperature stored in the data structure; and
adjusting the frequency of the local oscillator based on the difference between the current inclination and the stored seismic data acquisition unit inclination.

7. The method of claim 1, further comprising:
determining a current power supply operating voltage and a current operating temperature of the local oscillator;
determining a stored power supply operating voltage corresponding to the current operating temperature stored in the data structure; and
adjusting the frequency of the local oscillator based on a difference between the current power supply operating voltage and the stored power supply operating voltage.

8. The method of claim 1, further comprising:
monitoring the at least one environmental parameter; and
responsive to identifying a change in the at least one environmental parameter, updating the data structure with the change and a corresponding time stamp of the local timing signal.

9. The method of claim 1, further comprising:
responsive to determining a timing error, updating the data structure with the timing error, a corresponding measured environmental parameter, and a corresponding time stamp of the local timing signal.

10. The method of claim 1, wherein the local timing signal is aperiodic voltage having a nominal frequency.

11. A system for providing a stable timing signal for a seismic data acquisition unit, comprising:
a local oscillator configured to generate a local timing signal;
a wireless receiver configured to receive an external time reference, and discipline the local oscillator based on the external time reference;
at least one environmental sensor configured to measure at least one environmental parameter for the seismic data acquisition unit, the environmental parameters including an inclination of the seismic data acquisition unit;

a memory element; and a processor communicatively coupled to the memory element, the processor configured to:

determine a frequency error of the local oscillator by differencing time stamps of the external time reference over a frequency measurement time interval, wherein the frequency measurement time interval corresponds to a frequency accuracy for a variable time stamp uncertainty;

store, in the memory element of the seismic data acquisition unit, a data structure comprising (i) the frequency error, (ii) the time stamps from the external time reference, and (iii) measured environmental parameters encountered over the frequency measurement time interval; and during a time interval in which the wireless receiver is disabled, adjust a frequency of the local oscillator to correct for at least one timing error using data stored in the data structure.

12. The system of claim 11, wherein the processor is further configured to:

determine an average of a plurality of measurements of the at least one environmental parameter; and store the average in the data structure.

13. The system of claim 11, wherein:

the processor is further configured to enable the wireless receiver to receive the external time reference during the frequency measurement time interval, and disable the wireless receiver at the end of the frequency measurement time interval; and the wireless receiver is further configured to enter a low power state responsive to being disabled.

14. The system of claim 11, wherein the processor is further configured to:

receive historical environmental characteristic data corresponding to the at least timing error; and store the historical environmental characteristic data in the data structure.

15. The system of claim 11, wherein:

the at least one environmental sensor is further configured to measure a temperature of the seismic data acquisition unit; and the processor is further configured to store, in the data structure, measured temperatures encountered over the frequency measurement time interval.

16. The system of claim 11, wherein the processor is further configured to:

determine a current inclination and a current temperature of the seismic data acquisition unit;

determine a stored seismic data acquisition unit inclination corresponding to the current operation temperature stored in the data structure; and adjust the frequency of the local oscillator based on the difference between the current inclination and the stored seismic data acquisition unit inclination.

17. The system of claim 11, wherein the processor is further configured to:

determine a current power supply operating voltage and a current operating temperature of the local oscillator;

determine a stored power supply operating voltage corresponding to the current operating temperature stored in the data structure; and adjust the frequency of the local oscillator based on a difference between the current power supply operating voltage and the stored power supply operating voltage.

18. The system of claim 11, wherein the processor is further configured to:

monitor, via the at least one environmental sensor, the at least one environmental parameter; and responsive to identifying a change in the at least one environmental parameter, update the data structure with the change and a corresponding time stamp of the local timing signal.

19. The system of claim 11, wherein the processor is further configured to:

update, responsive to determining a timing error, the data structure with the timing error, a corresponding measured environmental parameter, and a corresponding time stamp of the local timing signal.

20. The system of claim 11, wherein the local timing signal is aperiodic voltage having a nominal frequency.

* * * * *